United States Patent

[11] 3,550,542

| [72] | Inventor | Grady W. Hollis |
| | | Spearsville, La. 71277 |
| [21] | Appl. No. | 797,557 |
| [22] | Filed | Feb. 7, 1969 |
| [45] | Patented | Dec. 29, 1970 |

[54] POISON APPLICATORS
3 Claims, 4 Drawing Figs.

[52] U.S. Cl. .................................................. 111/95, 43/124
[51] Int. Cl. ........................................................ A01m 17/00
[50] Field of Search .......................................... 43/124; 111/92, 95, 96, 99

[56] References Cited
UNITED STATES PATENTS

| 991,653 | 5/1911 | Sandoe | 111/95 |
| 2,390,686 | 12/1945 | Bishop | 111/95 |
| 2,857,864 | 10/1958 | Cromer | 111/95 |

Primary Examiner—Warner H. Camp

ABSTRACT: A poison applicator for burrowing pests such as salamanders and the like comprising a hollow body cylindrical in shape and serving as a storage reservoir for a quantity of poisoned grain, the body provided with a sharpened point with a grain discharge opening near the point and means for discharging a quantity of such poisoned grain directly into the burrow or raceway of the pest.

PATENTED DEC 29 1970

3,550,542

INVENTOR.

Grady W. Hollis

POISON APPLICATORS

The present invention pertains to poisoners generally, but more in particular to a poison applicator for burrowing rodents such as gophers, salamanders and the like.

It is well known that a lawn or garden can be completely ruined by burrowing creatures such as salamanders which seek out garden produce or flower bulbs by burrowing toward them in a tunnel just beneath the surface of the ground. Not only do these pests destroy the produce or plants but they make unsightly mounds of earth on a lawn where they choose to break through to the surface.

To rid the area of such pests, the home owner resorts to many things. He will blow smoke into the tunnels or secret himself at some distance from the spot where the burrowing rodent is breaking the earth's surface hoping to kill him with sticks, firearms or other means. The means of poison is usually turned to as a last resort, since there is no ready means of placing the poison directly into the tunnel of the pest. There is also the fear that, if the poison should be left in an open hole or at some nearby spot, it might be taken by some child or household pet with damaging results.

It is an object, therefore, of the present invention, to provide a poison applicator for burrowing rodents and the like wherein the poison may be deposited directly into the tunnel of the pest and not be laid upon the open ground where it might otherwise cause damage.

It is a further object of the invention, to provide a poison applicator which includes a poison depository or reservoir and means for dispensing a given quantity from such reservoir at desired points beneath the earth's surface.

Other objects and advantages of the invention will become apparent in the course of the following detailed description when viewed together with the accompanying drawing in which.

Figure 1:
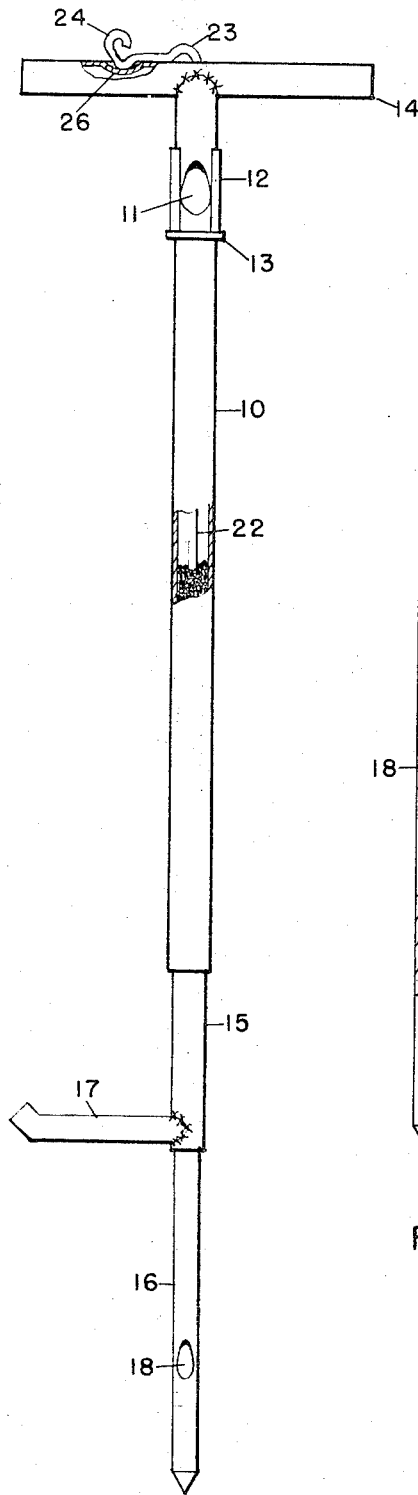
FIG. 1 is an elevational view of the invention in a poison applicator with certain portions broken away.

In the drawing numeral 10 designates a tubular body member of the invention. Toward the upper end of the body is an opening 11 formed through a sidewall of the body and through which poison pellets are "loaded" into the body. The pellets are preferably ground corn or some other seed mixed with dry poison according to the pest to be exterminated. Encircling the body 10 is a sleeve member 12 frictionally engaging the outer periphery of the body member 10 and serving as a door for the opening and closing of the opening 11. A raised, annular ring 13 is formed on the body member 10 to prevent the door 12 from sliding past the opening 11 and subject the device to spilling its poison.

Affixed to the body member 10 across the top end thereof and in the manner shown in FIG. 1 is a handle 14 which assists an operator in the use of the device.

The main body member 10 is restricted in its diameter twice as at 15 and 16. While this is not absolutely necessary for the operation of the device, it does not add to its appearance and also permits a smaller piercing point as will be subsequently described.

Extending outwardly from one of the restricted diameters 15, is a step 17 by means of which an operator may use the foot to force the point of the device into the earth's surface.

Figure 3:
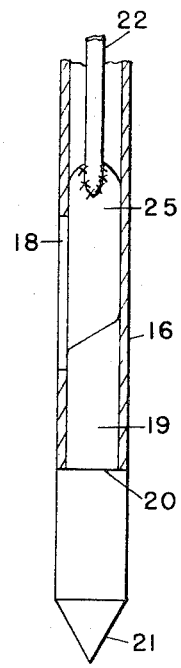
FIG. 3 is an enlarged view of the bottom end of the invention, the sidewalls of the device being broken away to disclose a cam member which is used in the depositing of the poison.

Through the sidewall of the lower restricted body portion 16 is a discharge window 18. By reference also to FIGS. 1 and 3 it will be noted that the lower end of the body member 10 is closed off by a rotatable plug 19 provided with a shoulder 20 abutting the lower end of the body member 16 and terminating at the lower end thereof in a conical point 21. As illustrated in FIG. 3 the plug 19 is fitted snugly into the body member 16 yet rotatable in either horizontal direction. Affixed to the upper end of the plug 19 is a small shaft 22 which is extended upwardly through the entire length of the body 10 and through the handle member 14. The upper end of the shaft is bent at right angles to its normal direction to form an actuating lever 23. The lever terminates in a loop 24 by means of which an operator may hold the lever 23 for the turning of the shaft 22.

Figure 4:
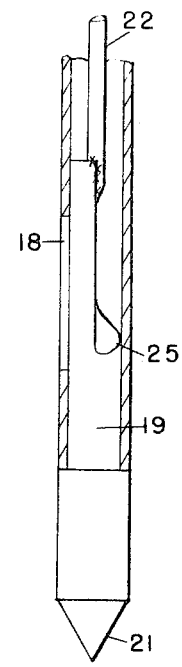
FIG. 4 is a view similar to FIG. 3 except showing the cam member in a position to close off the discharge opening in the sidewall of the device.

As illustrated in FIGS. 3 and 4 the plug 19 is provided with a cam 25 formed along a portion thereof. FIG. 4 shows the cam 25 in such a position that the back side thereof completely seals off the discharge window 18. In fact, the upper handle 14 is provided with a small recess 26 which normally prevents the shaft 22 from rotating and which also normally presents the back side of the cam 25 toward the discharge window 18 to prevent spillage of the poison pellets.

Figure 2:
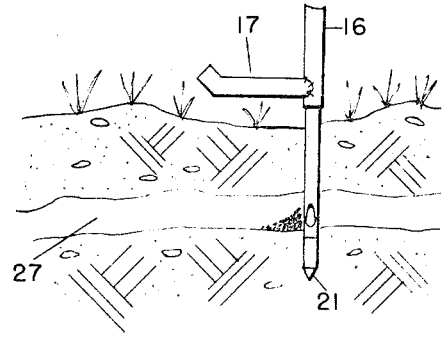
FIG. 2 is a broken view of the lower end of the device, the same being shown in the act of depositing a quantity of poison in the raceway of a rodent.

To use the device, an operator will seek out the path or burrow that the rodent is making in his yard or garden. By means of the step 17, he uses the foot to force the conical point 21 of the applicator into the ground and to a depth judged to be in the raceway 27 as illustrated in FIG. 2. By lifting the loop 24 from its detent 26, the operator rotates the shaft 22 one turn. This, in turn, rotates the lower cam 25 one complete turn—opening and closing the discharge window 18. It will be noted that the cam surface is spirally shaped upon the surface of the plug 19 so that upon rotation of the same, the pellets are forces out by the screw thread action of the same without depending upon simply the force of gravity. Thus, the operator knows that if he has a supply of poison in the reservoir, a definite deposit of the same has been made upon rotation of the cam.

The device is simple in its construction, easy to manufacture and operate and is safer than any device of the prior art. Since it is more-or-less locked in a normally closed position, it is not likely to spill its poison even if accidentally moved or dropped from its depository in a barn or tool house. Since the cam action deposits a given amount of the poison below the earth's surface, the poison is not likely to be taken by household pets or other animals for which it not intended.

I claim:

1. A poison applicator comprising a generally T-shaped structure, the main body of said structure consisting in a hollow shaft disposed to serve as a reservoir for a quantity of poison material, a crossmember affixed as a handle to the upper end of said shaft, a discharge opening in the sidewall of said hollow shaft at the lower end thereof, a rotatable cam in the hollow of said shaft and in juxaposition with said discharge opening, said cam including a conical point on the lower end thereof, a surface portion on said cam normally blocking said discharge opening in one position and another surface portion on said cam for forcing said poison material through said discharge opening when said cam is rotated into alignment with said discharge opening.

2. The device as claimed in claim 1 wherein the surface portion on said cam for forcing said poison material through said discharge opening constitutes a flat relieved surface on the periphery of said cam, said surface being disposed as a helix on the periphery of said cam for slightly less than 360° of its circumference, said helically formed surface serving as a screw thread to force only that portion of material lying in the relieved area of said cam surface through said discharge opening.

3. The device as claimed in claim 2 wherein said helically formed cam surface terminates at the bottom end thereof at a point which is in alignment with the bottom of said discharge opening the extended lower portion of said cam being of generally cylindrical shape and including said conical point adapted for piercing the burrow of the rodent to be poisoned.